Aug. 26, 1958 — E. J. ENRIGHT — 2,849,080
TRAP ATTACHMENT FOR VACUUM CLEANERS
Filed Nov. 19, 1956
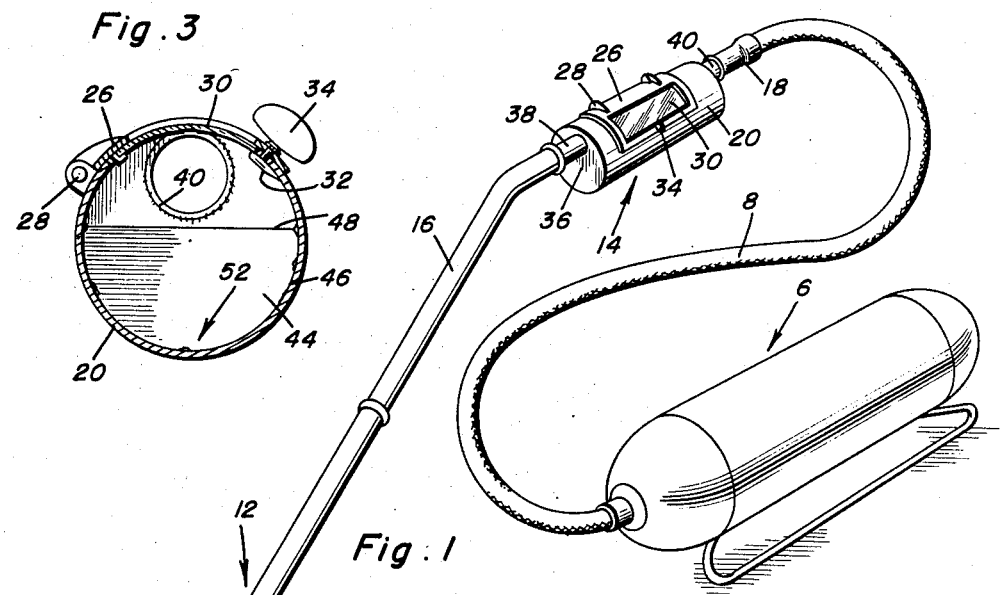
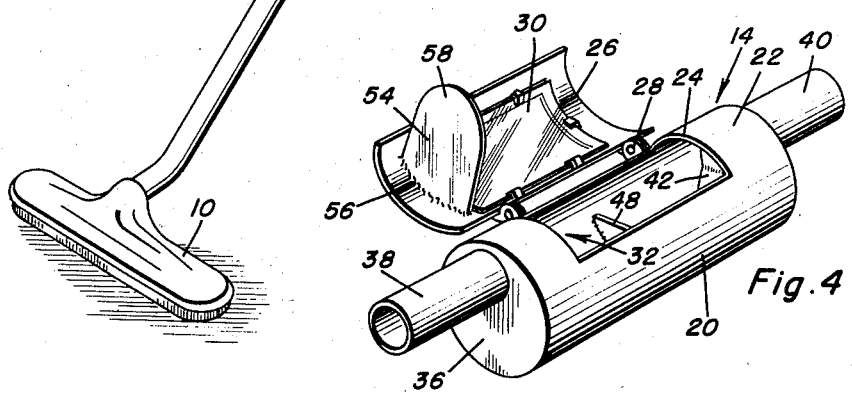
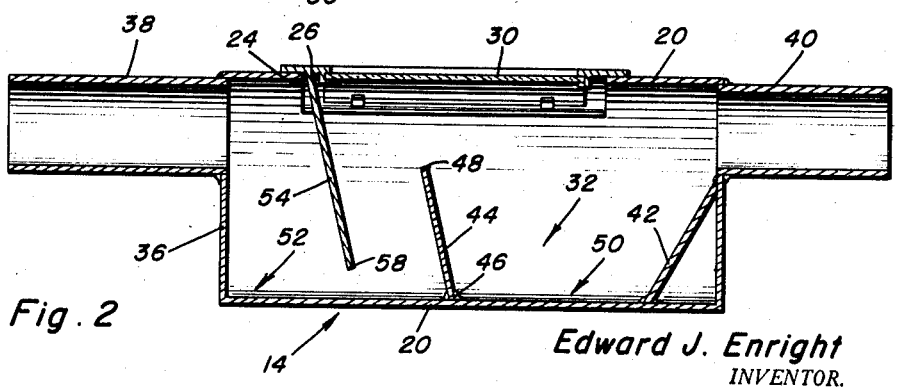
Edward J. Enright
INVENTOR.

United States Patent Office 2,849,080
Patented Aug. 26, 1958

2,849,080

TRAP ATTACHMENT FOR VACUUM CLEANERS

Edward J. Enright, Yakima, Wash.

Application November 19, 1956, Serial No. 622,914

2 Claims. (Cl. 183—110)

The present invention relates to a novel and improved trap which is adapted to be incorporated in the suction conduit or line of a vacuum cleaner and through which the dust and dirt laden air currents are forced to travel, in a now generally well known manner, so that all relatively heavy articles and objects will be separated and trapped and, if desired, conveniently retrieved.

Persons conversant with the art to which the invention relates are aware that traps having separating chambers which function to trap pins, needles, hairpins, coins and the like, are not new. It follows, therefore that the instant invention pertains to a trap which is structurally distinct and which is characterized by a novel arrangement of intercepting and deflecting baffle elements. Resorting to trial and error experiments and seeking to promote satisfactory and unhampered passage of air a highly efficient and practical trap has been devised.

In carrying out the principles of the invention a hollow casing with intake and discharge necks at its opposite ends is utilized. This provides a satisfactory separating and trapping chamber for the small articles mentioned, for tacks, nails, miscellaneous similar items, and in some instances rings and valuables that might otherwise be lost and obviates of course, the perplexing and exaspering job of searching by hand or otherwise through the dirty and messy contents of the refuse collecting tank or paper.

The invention also features a casing which is preferably cylindrical in cross-section and is provided at its top with an entrance opening or hand-hole and a hingedly mounted trap door which covers it, the door being novel in that it has a window embodied therein making periodical inspection of the contents of the trap easy and successful.

Other objects, features and advantages will become more readily apparent from the following description and the accompanying sheet of illustrative, but not restrictive drawings.

In the accompanying drawing, wherein like numerals are employed to designate like parts throughout the views:

Figure 1 is a perspective view of a conventional tank-type vacuum cleaner showing how the improved collecting and retrieving trap may be embodied in the suction conduit or line thereof;

Figure 2 is a lengthwise or longitudinal sectional view taken centrally through the trap by itself and drawn on an enlarged scale;

Figure 3 is a cross-section through the central portion of the trap; and

Figure 4 is a perspective view on an intermediate scale showing the trap door swung to open position.

In Figure 1 a tank-type vacuum cleaner is shown, the tank being denoted at 6, its hose 8, the nozzle or cleaning head at 10 and the hollow handle portion of the conduit at 12. The improved separating and collecting small article trap is denoted as an entity by the numeral 14 and is interposed between the components or parts 16 and 18 of the suction conduit or line. It then becomes actually a part of the line itself. It may be stated at this point that the trap is not restricted to use in connection with the particular vacuum cleaner shown. In fact, it may be adapted with slight revisions here or there to other forms of vacuum systems and other brands and types of manually usable vacuum cleaners.

In its preferred embodiment a hollow casing 20 of lightweight but durable sheet material is employed. It is preferably cylindrical in cross-section and elongated and of sufficient capacity to do the intended job well. Not only this, it should be sufficiently large that access may be had to the chamber portion for closely inspecting the trapped articles and for readily removing the same without having to dismantle the suction line. It is also to be mentioned that the trap is installed in the line in the position shown so that the portion 22 constitutes the top. In this top an opening or hand-hole 24 is provided. This is normally closed by an appropriately constructed door 26 hingedly mounted on the casing as at 28. The door is provided with a sight opening and a suitably mounted transparency 30 forming an inspection window. Thus with the door closed periodical inspection of the contents of the chamber portion 32 may be carried out in an obvious manner. A suitable catch or latch 32 as shown in Fig. 3 may be employed and operated by an exteriorly arranged turnbutton 34. The forward end portion of the casing 36 is apertured and provided with an aligned outstanding tubular member 38 which is conveniently referred to here as an intake neck. The opposite or rear end is likewise constructed with a discharge or outlet neck 40. It is to these necks 38 and 40 that the aforementioned conduit parts 16 and 18 are connected. Thus the dirt and dust laden air from the nozzle and handle portion of the conduit is compelled to pass through the chamber 22 on its way to the hose 8 and tank 6. In the lower corner portion of the chamber adjacent to the discharge neck fixed inclined plate 42 is provided and this is a sort of a chute and assists in the shunting dust laden air into the discharge neck and also facilitates hand removal of the trapped contents from the space in front of baffle 44.

There are two baffle plates or elements and the first one is denoted by the numeral 44 and this is substantially semi-circular in form and is slightly oblique angled having its marginal edges welded or otherwise joined to the wall portions as at 46. The upper edge 48 terminates in a plane which is substantially in line with the axes of the necks 38 and 40. This baffle is somewhat centrally arranged in the chamber and divides it into compartments or pockets one of which may be denoted at 50 and the other at 52. The companion or complemental baffle is denoted by the numeral 54 and this is substantially ovate in form and has one end fixed as at 66 to an end portion of the trap door. This baffle has a lower rounded end portion 58 which descends into the pocket or compartment 52 and is thus situated between the baffles 44 and the neck-equipped front wall 36. The baffle 54 is also oblique angled and the two baffles 44 and 54 are in approximate spaced parallelism.

As is evident the trap herein disclosed is simple in construction, easy to install, is inexpensive to manufacture, is highly efficient in use and is otherwise well adapted for the purposes for which it has been devised. By reason of the window-equipped door one may easily check the trapped contents of the trap from time to time. If access to the chamber or compartment thereof is thought to be necessary the door is swung open and the hand-hole 24 is then accessible to reach into the chamber and retrieve any articles which may be desired.

The arrangement and cooperation of baffles in the chamber ensures effectual separation and recovery of metallic objects, beads, buttons and so on and so forth without the necessity of delving, as it were, into the dusty remains of the tank or receptacle. If upon observing through the door the user should decided that any objects reposing therein are not valuable and should not be retrieved, he can, by imparting a slight upward shake to the structure, return the objects therein into the air stream where they will then be conducted into the collection tank in a reliable manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in the suction line of a vacuum cleaner, a trap for communicative but removable installation in said line, comprising a hollow casing having intake and discharge necks communicating with the chamber portion of said casing, said casing also having an entrance opening, an openable trap door normally closing said opening, and baffle elements mounted and projecting into the air flow path of said chamber, one of said baffle elements being fixed in said casing between the opposite ends of the casing, said casing being circular in cross-section and said one baffle element being substantially semi-circular in form, another one of said baffle elements being fixed to and carried by said door, both of said baffle elements being obliquely angled and spaced apart in general parallelism, said last named baffle element depending into the chamber from one transverse end portion of said door and being situated between the intake neck and said first named baffle element.

2. A trap attachment for a vacuum cleaner or the like comprising an elongated casing circular in cross-section and having an entrance opening in its upper half portion and a window-equipped closing door which normally closes said opening, a fixed baffle in the lower half portion beneath the central portion of said opening and door, said baffle being substantially semi-circular in form and having its marginal edge portions attached to cooperating wall portions of the casing, said baffle being obliquely inclined and the upper edge thereof being disposed slightly above the longitudinal axis of said casing, said casing being provided at its forward and rearward ends with outstanding axially aligned attaching necks, one neck serving as an intake and the other neck serving as a discharge, said necks communicating with the chamber portions of said casing, and said door being provided at one end portion with an integral baffle extending downwardly through the opening and into the chamber and situated in the space between said first named baffle and the forward end of said casing.

References Cited in the file of this patent

UNITED STATES PATENTS

| | | |
|---|---|---|
| 558,101 | Pickle | Apr. 14, 1896 |
| 944,779 | Fogarty | Dec. 28, 1909 |
| 954,164 | Broekema | Apr. 5, 1910 |
| 1,363,331 | Livermore | Dec. 28, 1920 |
| 1,821,842 | Long | Sept. 1, 1931 |
| 1,839,582 | Nordhem | Jan. 5, 1932 |
| 2,133,141 | Holm-Hansen | Oct. 11, 1938 |
| 2,613,454 | White | Oct. 14, 1952 |